(12) United States Patent
Danner

(10) Patent No.: US 6,605,182 B1
(45) Date of Patent: Aug. 12, 2003

US006605182B1

(54) POLYMERS, THEIR PREPARATION AND THEIR USE

(75) Inventor: Bernard Danner, Riedisheim (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 08/973,607

(22) PCT Filed: Jun. 13, 1996

(86) PCT No.: PCT/EP96/02561

§ 371 (c)(1), (2), (4) Date: Dec. 11, 1997

(87) PCT Pub. No.: WO97/00272

PCT Pub. Date: Jan. 3, 1997

(30) Foreign Application Priority Data

Jun. 14, 1995 (DE) .......................... 195 21 695

(51) Int. Cl.⁷ ........................... D21C 9/10; C08F 20/22; C08F 20/28

(52) U.S. Cl. ...................... 162/72; 162/78; 252/186.27; 252/186.29; 8/111; 526/229; 526/292.95; 526/238.2; 526/238.22; 526/238.23; 524/401; 524/845

(58) Field of Search ................. 526/238.22, 238.23, 526/238.2, 229, 292.95; 252/186.28, 186.27, 186.29; 524/801, 845, 401; 8/111; 162/72, 78

(56) References Cited

U.S. PATENT DOCUMENTS

| | | | | | |
|---|---|---|---|---|---|
| 2,606,881 A | * | 8/1952 | Zief et al. | ............... | 526/238.21 |
| 2,798,053 A | * | 7/1957 | Brown | .................. | 526/238.23 |
| 4,363,699 A | | 12/1982 | DeCeuster et al. | ........... | 162/71 |
| 4,587,319 A | * | 5/1986 | Tournier | ................ | 526/238.22 |
| 4,916,178 A | | 4/1990 | Amati et al. | ................ | 524/401 |
| 4,916,699 A | | 4/1990 | Ohashi | ........................ | 371/17 |
| 5,201,945 A | * | 4/1993 | Shimizu et al. | ............... | 526/62 |
| 5,241,026 A | | 8/1993 | Amati et al. | ................ | 526/229 |
| 5,296,239 A | * | 3/1994 | Colery et al. | ................ | 424/613 |
| 5,760,150 A | * | 6/1998 | Bachas | .................. | 526/238.23 |

FOREIGN PATENT DOCUMENTS

| | | |
|---|---|---|
| DE | 4344029 | 6/1995 |
| GB | 636322 | 6/1945 |

* cited by examiner

Primary Examiner—Daniel S. Metzmaier
(74) Attorney, Agent, or Firm—Sangya Jain; Scott E. Hanf

(57) ABSTRACT

(Co)poly-α-hydroxyacrylic-acid-based polymers (P), optionally in lactonized form or in salt form, optionally as Mg-complexes, and which are characterized by a content in carbohydrate units and 2-hydroxy-2-carboxyethylene-1,2 monomer units, are suitable as biologically degradable, alkali-resistant stabilizers for peroxide bleaching agents.

27 Claims, No Drawings

POLYMERS, THEIR PREPARATION AND THEIR USE

In peroxide bleaching of fibrous material, in particular of cellulosic fibrous material, for increasing the bleaching yield, i.e. in order to avoid a premature decomposition of the peroxide bleaching agent—before all hydrogen peroxide—there are employed stabilizers, which may be formulated as stock solutions and before all for continuous bleaching processes, also as reinforcing liquors. Depending on the process the reinforcing liquors may be of a different alkalinity and may also be very strongly alkaline, e.g. of an alkalinity that corresponds to 0.2N to 8N NaOH. For the employed stabilizer it is desired that they be stable also at high alkalinities. Since the stabilizers are employed only as adjuvants, i.e. shall not build up or shall build up only in a labile way on the substrate and are finally present in the backwater, it is thus desired that these adjuvants be biologically degradable.

From U.S. Pat. No. 4,363,699 it is known to bleach textile material or paper with hydrogen peroxide under alkaline conditions in the presence of certain sodium polyahydroxyacrylates. In U.S. Pat. No. 4,916,699 there are described poly-α-hydroxyacrylates of high stability to alkali, which may also be formulated in alkaline stock solutions and reinforcing liquors. In DE-A43 44 029 there are described copolymers that derive from certain mono- or disaccharides and certain unsaturated sulphonic acids or dicarboxylic acids and monoethylenically unsaturated $C_{3-10}$-carboxylic acids (there are named acrylic acid and methacrylic acid) or from certain mono- or disaccharides and acrylic acid, as dispersants and cobuilders or sequestrants. These copolymers do not have a sufficient stabilizing activity on peroxy bleaching agents (this means that in the course of the bleaching process the peroxide decomposition provoked by the alkali cannot be sufficiently hemmed by them, so that a substantial proportion of the peroxide is decomposed prematurely, i.e. long before completion of the bleaching process, and thus cannot display its bleaching activity), and thus for the peroxide bleaching it is recommended to combine the copolymer with stabilizers for percompounds. However, it is also possible to bleach with a peroxide without using a stabilizer, but the use of a stabilizer increases significantly the yield by avoiding premature decomposition of the peroxide, which is of particular importance in alkaline peroxide bleaching liquors, especially in more concentrated alkaline peroxide bleaching liquors, such as those used in padding processes.

It has now been found, that the below defined polymers (P), which contain the monomer units (a) and (s), while the presence of costly sulphogroup-containing monomer units is not necessary, meet surprisingly well the above requirements, namely not only with reference to biological degradability but also as for stability, especially under strongly alkaline conditions, e.g. at $\geq$0.2N NaOH, or even $\geq$0.5N NaOH, principally $\geq$2N NaOH, and efficiency for the stabilizing of peroxy compounds in the alkaline peroxide bleaching (in particular in padding liquors and in stock solutions), namely also without the presence of additional sequestrants or other stabilizers.

The invention relates to the polymers (P), their production and use, as well as to the corresponding (P)-containing compositions and alkaline stock solutions as are suitable for bleaching liquors, and to the corresponding (P)-containing bleaching liquors.

A first object of the invention is, thus, a (co)poly-α-hydroxyacrylic-acid-based polymer (P), optionally in lactonized form or in salt form, which is characterized by a content in (s) at least one carbohydrate unit and
(a) at least one 2-hydroxy-2-carboxyethylene-1,2-unit, or a mixture of such polymers (P).

The polymers (P) of the invention are obtainable by polymerisation of at least one vinyl monomer (A), which provides the monomer units (a) and which is principally an a-halogenacrylic acid or a salt thereof, and optionally at least one further vinyl monomer (B), in the presence of at least one optionally modified carbohydrate (S), which provides the unit (s), and optionally reaction of the polymerisation product with at least one base for salt formation.

The units (a) correspond in the non-lactonized acid form to the formula

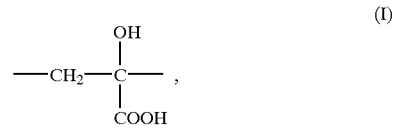

as occur e.g. in poly-α-hydroxyacrylic acids (and therefore are also called "α-hydroxyacrylic acid units"). Optionally a carboxylic group in (a) may be lactonized with a suitable hydroxy group or it may be present in salt form.

As vinyl monomers (A) there may be employed monomers which in their polymerisation lead to corresponding 2-hydroxy-2-carboxyethylene-1,2 units, principally α-Hal-acrylic acid, wherein Hal signifies chlorine or bromine, i.e. α-chloroacrylic acid or α-bromoacrylic acid, or a hydrosoluble salt thereof. Preferably as (A) there is employed ($A_1$), i.e. α-chloroacrylic acid optionally in salt form. If desired there may be employed a precursor of ($A_1$), e.g. α,β-dichloropropionic acid or a functional derivative thereof (e.g. methylester or chloride), which before the polymerisation to ($A_1$) is dehydrochlorinated and, if required, saponified.

As further vinyl monomers (B), come into consideration mainly low molecular anionic or non-ionic monomers, in particular ($B_1$), i.e. α,β-ethylenically unsaturated aliphatic carboxylic acids containing preferably 3 to 6 carbon atoms, e.g. acrylic acid, methacrylic acid, maleic acid, itaconic acid, aconitic acid, fumaric acid or citraconic acid.

The monomers (A) and (B), in particular ($A_1$) and ($B_1$), may be employed in the form of the free acids or, preferably, at least in part in the form of a hydrosoluble salt, and if they are employed as salts, these are transformed to the acid form in the acidic reaction medium. There may e.g. be employed ammonium salts or preferably alkali metal salts (e.g. Li-, Na- or K-salts), with particular preference sodium salts of the mentioned monomers. The monomers (A) and (B), in particular ($A_1$) and ($B_1$) are advantageously employed in such quantitative ratios that (A) amounts to at least 50 mol-%, i.e. to 50 to 100 mol-% of [(A)+(B)], respectively so that (a) amounts to 50 to 100 mol-% of [(a)+(b)], in which (b) are the monomer units introduced by reaction with (B). Advantageously the proportion of (A) is 80 to 100 mol-%, with particular preference 100 mol-% of [(A)+(B)], respectively the proportion of (a) amounts advantageously to 80 to 100 mol-%, preferably 100 mol-% of [(a)+(b)], i.e. preferably there is employed no (B).

As optionally modified carbohydrates (S) come into consideration any such compounds containing at least three carbon atoms and having polyol character, i.e. containing at least three hydroxy groups per carbon chain or ring, and which are soluble, suspendable or swellable in water. As (S)

there are principally meant natural saccharides or modification products thereof, i.e. saccharides that are obtained from animal or vegetable products (e.g. from the processing of milk, honey or parts of plants) or simple modification products thereof, e.g. enzymatically or chemically modified products (e.g. by hydrolysis, by hydrogenation, by oxidation, by partial etherification or esterification and/or by derivatisation), so long as the essential polyol character of the saccharide is maintained. However, it is also possible to employ synthetic saccharides, principally polymerisation products of mono- or/and disaccharides as are producible by polymerisation in aqueous solution, but preferably the saccharides (S) are natural saccharides or simple modification products thereof.

As carbohydrates (S) come advantageously into consideration mono-, oligo- or polysaccharides, whose monomer units contain 4 to 7, preferably 5 or 6 carbon atoms. As modified carbohydrates (S) come principally into consideration those carbohydrates in which one ot two functional groups have been chemically modified, e.g. by reduction to polyols or desoxysugars, by oxidation to mono- or dicarboxylic acids, or by alkylation e.g. with unsubstituted or substituted low molecular alkyl, principally alkylation with unsubstituted $C_{1-4}$-alkyl, in particular methyl or butyl, by carboxyalkylation, mainly carboxymethylation (e.g. by reaction with choloracetic acid), by addition of epoxides (e.g. ethylene oxide) to oxyalkylation products, or by reaction with optionally substituted chlorohydrins, or by acylation, e.g with acyl radicals of low molecular carboxylic acids, principally of $C_{2-4}$-carboxylic acids, in particular acetyl, or by derivatizing, so long as there are present at least three hydroxy groups with carbohydrate character per carbon chain or ring.

As (S) come into consideration any mono-, oligo- or polysaccharides or simple modification products thereof or mixtures thereof, in particular ($S_1$) monosaccharides,
($S_2$) oligosaccharides,
($S_3$) polysaccharides and
($S_4$) modified saccharides.

As ($S_1$) are suitable e.g. $C_{4-6}$-monosaccharides, such as e.g. erythrose, threose, xylose, ribose, arabinose, lyxose, glucose, mannose, gulose, galactose, fructose, allose, altrose, idose, talose, and mixtures thereof. As ($S_2$) are suitable open-chain or cyclic oligosaccharides, such as e.g. lactose, maltose, cellobiose, raffinose, gentiobiose, trehalose, melezitose, dextrines and cyclodextrines (α, β and/or γ) and mixtures thereof. As ($S_3$) are suitable any polysaccharides that are soluble, suspendable or swellable in water, principally starch polysaccharides, e.g. ($S_{31}$) substantially linear polysaccharides occurring in starches, in particular amylose and degradation products (preferably hydrolysis products) thereof, e.g. sirup or dextrines, as well as mixtures of such polysaccharides, and ($S_{32}$) substantially linear other polysaccharides and branched polysaccharides, e.g. cellulose, xylanes, arabanes and galactanes. Optionally the polysaccharides may be at least partially enzymatically or acid-hydrolytically modified, e.g. degraded, (e.g. to oligosaccharides). As ($S_4$) are suitable simply modified saccharides (mono- or preferably oligo- or polysaccharides), principally reduction products of mono- or oligosaccharides to corresponding polyols or desoxy sugars, oxidation products to carboxylic acids, acylation products or alkylation products, or also naturally occurring carboxylic acids, polyols, alkyl substituted saccharides or other derivatives, e.g. sulpho group-containing saccharides. As ($S_4$) come principally into consideration the following modified saccharides: ($S_{41}$) simple polyols, e.g. alditoles, preferably $C_{5-6}$-polyols, e.g. sorbite or mannite, ($S_{42}$) alkyl-substituted saccharides, e.g. inositols and alkylglykosides, e.g. butyl- or methylglucosides, ($S_{43}$) carboxylic acids, optionally in salt form, principally aldonic- or uronic acids, e.g. gluconic acid, gulonic acid, glucoheptonic acid, glucuronic acid, and alginic and pectic acids and their partial decarboxylation products, and ($S_{44}$) other saccharide derivates, e.g. sulphate-containing natural products, acylated saccharides, saccharides alkylated with substituted alkyl (e.g. carboxyalkylated, oxyalkylated or reacted with optionally substituted chlorohydrins), modified pectines or derivatised polysaccharides. As pectines come in general into consideration known pectines, e.g. from fruit peel or principally such as occur in starches, e.g. in native starch flours and enzymatically modified derivatives thereof, e.g. enzymatically fluidified derivatives of pectines from starches, or also synthetic amylopectine.

The polysaccharides ($S_3$), principally the starch polysaccharides ($S_{31}$), may be modified in a manner conventional per se with known enzymes, e.g. with hydrolases, principally glycoside hydrolases, in particular with amylases, preferably α-amylases, or/and may be modified by acid hydrolysis, advantageously by the action of strong mineral acids, preferably sulphuric, phosphoric or hydrochloric acid, or strong carboxylic acids, preferably citric, formic, acetic, phthalic and benzoic acid.

With particular advantage there are employed as (S) for the polymers (P) of the invention starch components as conventionally occurring in starch flours (e.g. as obtained from parts of plants such as legumes, cereals, tubers, palm mellow or algae), e.g. rice starch, corn starch, potato starch, tapioca starch, soybean starch, guaran, carragheen, carob bean gum, agar or ghatti gum and mixtures thereof.

According to an advantageous feature of the invention, there are employed as (S) (S') i.e. technical, optionally purified or/and enzymatically modified starches, e.g. in the form of starch flours.

The process of the invention for the production of the polymers (P) takes place under acidic conditions and leads first to an acid polymer (P1), which by reaction with a base may be transformed to the corresponding salt form (P2).

The process for the production of the acid polymer (P1) or of a mixture thereof is preferably characterized in that ($A_1$) and optionally ($B_2$) is polymerized in aqueous acidic medium in the presence of (S), preferably ($S_3$), with particular preference ($S_{31}$).

The polymerisation takes place advantageously in aqueous medium and at pH-values which are advantageously ≦6, preferably ≦4, in particular in the range of 0 to 6, preferably 0.1 to 4. The pH advantageously adjusted with a strong mineral acid, e.g. phosphoric acid or preferably sulphuric acid or with a strong carboxylic acid, e.g. citric acid. The concentration of the monomers, i.e. (A) and optionally (B), and of the components (S) may vary in a broad range and is expediently chosen so that there is provided a true solution of ($S_1$) or a true or colloidal solution of ($S_2$) or ($S_4$) or that ($S_3$) or ($S_4$) is in suspended or swollen, dispersed form or as a colloidal solution, and the mixture is stirrable. The (S)- and monomer-content of the reaction mixture is e.g in the range of 2 to 70% by weight, advantageously in the range of 5 to 70% by weight, preferably 10 to 60% by weight. The reaction temperature for the polymerisation is mainly at values in the range of 20 to 150° C., advantageously 40 to 98° C., preferably 60 to 90° C. The polymerisation is substantially radicalic and takes place suitably under radical-forming conditions, e.g. in the presence of radical-forming initiators or under the action of suitable irradiation of high energy content, as can conventionally be employed for polymerisation for the production of poly-α-hydroxyacrylic acid. The following initiators or catalysts come, in particular, into consideration: water soluble azo compounds [in particular 4,4'-azo-bis4-cyanopentanoic acid) or 2,2'-azo-bis-(2-amino-dipropane) dihydrochloride], redox systems or peroxy-compounds (in particular diacetylperoxide, di-tert.butylperoxide, tertbutylhydroperoxide, tert.butylperpivalate, cumenehydroperoxide, benzoylhydroperoxide, dibenzoylperoxide, diisopropylperoxydicarboxylate, sodium perborate, hydrogen peroxide or ammonium- or alkalimetal-peroxydisulphate); it is also possible to employ cerium(IV)-salts, such as cerium(IV)ammonium salts, e.g. cerium(M)ammonium sulphate, as initiators, preferably, however, there are employed no cerium(IV)-compounds. Among the mentioned polymerisation initiators the peroxy compounds are preferred, mainly ammonium- or potassium-peroxydisulphates and hydrogen peroxide, before all hydrogen peroxide. The hydrogen peroxide may be employed as such or as $H_2O_2$-yielding compound, e.g. as potassium peroxide; preferably, however, there is directly employed $H_2O_2$. The amount of the initiators is expediently chosen depending on the monomers, in particular on the concentration of (A) and, if present, (B), and their molar ratio to (S). The molar ratio of the monomers (A) and (B) referred to (S) may range in a broad scope, suitably so that in the final product there is present on average at least one α-hydroxyacrylic acid unit for every carbohydrate starting molecule. Depending on the molecular weight of the carbohydrate backbone in the final product there may be employed for every mole of total monomers [(A)+(B)], in particular [(A$_1$)+(B$_1$)], advantageoulsy 20 to 1000, preferably 30 to 500, in particular 40 to 300 g of total hydroxy-compounds (S). For every mole of carbohydrate unit (sI) in (S) there are employed advantageously 0.5 to 5, preferably 0.8 to 4, with particular preference 1 to 3 moles or total monomers [(A)+(B)], in particular [(A$_1$)+(B$_1$)]. As carbohydrate unit (si) in the optionally modified starting carbohydrate (S) there is understood an open chain or preferably cyclic, optionally modified carbohydrate group bearing for every group of connected carbon atoms, at least three hydroxy groups as substituents and, if it is cyclic, contains a (preferably furanoside or pyranoside) oxygen atom as a ring element, and where the units (s1) may optionally be joined to each other over oxygen (e.g. a glucoside ring as occurring in oligo or polyglucosides). If hydrogen peroxide is used as an initiator, its concentration, referred to the monomers (A) and (B), is advantageously at least 1 g of $H_2O_2$ for every mole of [(A)+(B)], e.g. 2 to 60 g of $H_2O_2$ or the equivalent amount of another peroxy catalyst. The respective reactants an d initiators and the acid may be added at once or stepwise; a good reaction c ontrol may be achieved e.g. by stepwise addition of acid and initiator. The degree of polymerisation of the employed monomers (A) and (13) may be controlled, e.g. by means of the amount of peroxy initiator.

The enzymatic treatment, e.g. with an α-amylase, takes place e.g. at pH-values in the range of 5 to 8, at elevated temperature, e.g. in the range of 50 to 95° C., and at enzyme concentrations of 0.5 to 10 g/l.

An enzymatic treatment, e.g. of oligo- or polysaccharides or respectively of pectines, may also precede the mentioned polymerisation in one process sequence in a same reaction vessel. The enzymatic reaction may then suitably be interrupted by addition of the mineral acid, e.g. at pH-values ≦4.

Under the strongly acidic polymerisation conditions there may also be carried out a pre-determined degradation of the employed polysaccharides or pectines.

By the acidic polymerisation conditions there are formed at first the acid polymerisates (P1), in which the α-hydroxyacrylic acid units are present at least in part in lactonized form, and the little soluble polymerisation product is present in the acidic reaction medium as a discontinuous phase, e.g. as a precipitate or in suspended form; by the subsequent treatment with a base the optionally lactonized a-hydroxyacrylic acid units, as well as any further carboxylic groups, are transformed to their salt form and in this also the respective lactone rings are hydrolyzed, by this there is formed the polymer salt (P2).

For hydrolysis and salt formation there may be added suitable bases, if desired in aqueous form, e.g. ammonia, alkali metal hydroxides and/or low molecular mono-, di- or tri-alkylamines or -alkanolamines [in particular triethanolamnine or triisopropanolamine] and/or buffering alkali metal salts, among which alkali metal hydroxides (lithium, sodium or potassium hydroxide) are preferred, especially sodium hydroxide and potassium hydroxide.

By the salt formation with the mentioned bases the less soluble polymers (P1), which contain the α-hydroxyacryeic acid units in optionally lactonized form and are formed e.g. in suspended form in the aqueous acidic medium, may be transformed into a more soluble salt form (P2), so that there is formed a polymer solution.

If desired the obtained polymers may be derivatized, e.g. by reaction with derivatizing reactants (C), preferably under basic conditions. As derivatizing reactants (C) are suitable compounds known per se, mainly alkylating agents e.g. halides (e.g. chloroacetic acid, chlorpropionic acid). The derivatizing reaction with (C) may be carried out in a mainer known per se, if desired also in the same reaction medium, e.g. at pH-values in the range of 7.5 to 10—adjusted advantageously by addition of alkali metal hydroxide—and at elevated temperature, e.g. at 50 to 95° C.

The length and distribution of the (co)polymer chains may be conditioned by the choice of the weight ratios and reaction conditions. The polymers (P) may, thus, contain the units (a) and, if present, (b) built on or in to form (co) polymers or/and graft polymers; in the case of an acidic (partial) hydrolysis of the saccharides (S) also (A) or respectively (B) may be built in or on in the respective place.

The molecular weight $\overline{M}_W$ of the obtained polymers (P), referred to the sodium salt form of (P2), is e.g. in the range of 500 to 1,000,000, advantageously 500 to 200,000, preferably in the range of 600 to 60,000, in particular 600 to 12,000. The mentioned molecular weights are intended as weight average. The polydispersity is advantageously <4. The molecular weight and the polydispersity may be determined by gel permeation chromatography against normed polyacrylic acid standards.

The so-produced polymers are mostly obtained in aqueous form. These aqueous compositions are as such stable, especially in the above mentioned concentrations (e.g. 2 to 70% by weight, advantageously 5 to 70% by weight, preferably 10 to 60% by weight), and may be handled so as they have been produced, in particular they may be shipped and used, or they may also, if desired, be dried, e.g. by spraying or granulating, after which for use they may be correspondingly diluted again with water.

The polymers (P) find their use as adjuvants in the treatment of fibrous material, in particular as stabilizers for the peroxide bleaching of cellulose-containing fibrous material, and a further object of the invention is a process for the peroxide bleaching of cellulose-containing fibrous material in the presence of alkali and of a stabilizer, which is characterized by the use of (P), preferably of (P2), as a stabilizer.

As alkali are suitable principally (D) alkali metal hydroxides.

For use in the peroxide bleach it is of particular advantage to combine (P) respectively (P2) with magnesium ions, suitably by treating (P1) or preferably (P2) with (E) hydrosoluble magnesium salts, e.g. with hydrosoluble magnesium salts of a mineral acid, preferably magnesium chloride or sulphate, by which there are formed (P3), i.e. magnesium complexes or complex salts of (P) or respectively of (P2), which display a particularly pronounced stabilizing action in the peroxide bleach. A particular object of the invention are the Mg-complexes (P3).

(P2) and/or (P3) are readily hydrosoluble and also compatible with alkalies; they may be dissolved in water and also in aqueous alkali, in particular in aqueous alkali metal hydroxide solutions.

The polymers (P) of the invention, in particular (P2) and/or (P3), may be advantageously formulated as aqueous concentrated compositions, that contain (P2) or respectively (P3) and optionally further additions, in particular (E) as defined above, and/or (G) a sequestrant which is different from (P), preferably in the below described quantitative ratios. The (P2)- or (P3)-content in the concentrated aqueous compositions is e.g. in the range of 2 to 70, advantegeously 5 to 70, preferably 10 to 60% by weight, referred to (P2), the (E)-content is advantageously in the range of 0 to 20, preferably 0 to 10, in particular 0 to 6% by weight, the (G)-content is advantageously in the range of 0 to 50, preferably 0 to 20, principally 0 to 10, in particular 0 to 4% by weight, the water content is advantageously $\geq 20\%$ by weight, preferably $\geq 30\%$ by weight.

For the bleaching process of the invention are suitable in general, conventional bleaching machines and systems,and conventional bleaching methods as are, in general, employed for the alkaline bleaching of cellulosic fibrous material from aqueous medium, before all in the textile pre-treatment or in the working-up of grey paper. Before addition into the bleaching liquor, the bleaching liquor components to be employed are suitably formulated to stock solutions (also reinforcing liquors) containing the alkali (preferably NaOH) and the stabilizer (P), preferably (P2). If required, the stock solutions (respectively reinforcing liquors) may contain further additions as are to be employed for the respective procedure, e.g. a hydrosoluble magnesium salt (E), e.g. magnesium chloride, for adjusting the water hardness or for forming Mg complexes with (P), preferably with (P2), (F) surfactants (in particular wetting agents)

and occasionaly also further substances, such as lubricants, other preferably low molecular sequestrants (G), optical brighteners a.s.o., as are desired for the respective bleaching process. The peroxide (H) employed for the bleaching may also be present in the stock solution or may be added separately to the liquor. In a particular feature of the process one or more of the mentioned components, with the exception of the peroxide, and in addition to (P) or respectively (P2), optionally in the form of Mg-complex (P3), may be formulated as a concentrated aqueous stock or reinforcing solution and the peroxide may be added directly into the bleaching liquor or may also be admixed into the stock solution short before the addition into the bleaching liquor. If desired, however, the peroxide may also be already present, together with the remaining components, in the concentrated solutions.

A particular object of the invention are aqueous alkaline stabilizer-containing, preferably concentrated solutions, in particular stock solutions, which are characterized by a content of the components (P) as defined above, preferably (P2) or (P3), and (D) alkali metal hydroxide, in particular those additionally containing at least one of the components (E), (F) and (G); in particular, however, also those containing (H) a peroxide-based bleaching agent in addition to the mentioned components.

A further object of the invention consists in employing in the bleaching process of the invention. The mentioned components in the form of the mentioned stock solutions containing (P) and (D) as well as (E), (F) and/or (G) and optionally (H).

The mentioned concentrated aqueous solutions contain component (P), preferably as (P2) or (P3), advantageously in concentrations of 1 to 50 g/l, preferably 1.4 to 35 gil [calculated as (P2) in the form Na-salt].

Component (D) is preferably KOH or in particular NaOH and is advantageously present in concentrations of 5 to 350 g/l, e.g. 80 to 200 g/l; with particular preference the concentration of the alkali metal hydroxide, in particular of the NaOH, is 0.2 to 8N, advantageously 0.5 to 7 N, preferably 2 to 5N NaOH.

Component (E), which expediently is a salt suitable for complex formation, e.g. magnesium chloride, is—if present—advantageously employed in such concentrations as are sufficient for achieving a water hardness of the bleaching liquor of 3–10° dH, in particular 4–8° dH.

Component (F) may be required depending on the kind of the bleaching method, and has advantageously the character of a wetting agent, [e.g. of a detergent, if the bleaching is combined with a boiling-off of the textile material, or it serves for the wetting of a dry substrate employed in the bleaching bath]. Preferably the employed wetting agents (F) are non-ionogenic, anionactive or amphoteric. The non-ionogenic surfactants are e.g. addition products of ethylene oxide and optionally propylene oxide to corresponding alcohols, e.g. oxoalcohols or fatty alcohols with 8 to 18 (preferably 9 to 15) carbon atoms, and contain e.g. on average 2 to 40 ethyleneoxy units per molecule. In the anionactive surfactant molecules the anionic radicals are advantageously sulphate, sulphonate, phosphoric acid ester, phosphonate or carboxylic acid groups (e.g. soaps or carboxymethylation products of non-ionogenic surfactants), the corresponding lipophilic radicals contained in the anionactive surfactants are mainly aliphatic or araliphatic hydrocarbon radicals with 10 to 24 carbon atoms; optionally the anionactive surfactants may contain alkyleneoxy units, in particular ethyleneoxy or propyleneoxy (e.g. 1 to 30 ethyleneoxy groups). The anphoteric surfactants may e.g. be acid modified amines, where the lipophilic radicals may be those as mentioned above, among which the aliphatic ones are preferred, the molecule may optionally contain alkyleneoxy units and the amino groups may optionally be quatemized. Among the mentioned surfactants (F) the non-ionogenic ones and the anionactive ones are preferred. The concentration of the surfactants depends on the particular bleaching process and may e.g. range in the scope of 0.1 to 10 g of surfactant per liter of stock solution.

As component (G) are principally suitable low molecular sequestrants, especially carboxylic- or phosphonic-acidgroup-containing amino compounds, in particular carboxymethylated or phosphono-methylated aliphatic di- or tri-amines or ammonia, e.g. nitrilotriacetic acid sodium salt, ethylenediaminetetraacetic acid sodium salt, diethylenetriaminepentacetic acid sodium salt, dipropylenetriaminepentaacetic acid sodium salt and diethylenetriaminepentamethylphosphonic acid sodium salt, among which nitrilotriacetic acid is preferred (i.a. also because of biodegradability). Also the above mentioned trialkanolamines, preferably triethanolamin, may display in the compositions and liquors of the invention a sequestering action and be employed as (G), especially if (P2) is present as alkali metal salt. The amount of component (G) may range in a broad scope and is advantageously not higher than the employed amount of (P), or respectively (P2) or (P3). For every 100 parts of (P), or respectively (P2), there are employed e.g. 0 to 100, advantageously 0 to 50, preferably 0 to 12 parts by weight of (G).

Component (H) may, as already mentioned, be given directly into the bleaching liquor or be admixed with the remaining stock solution, before the addtion into the bleaching liquor, or be present from the beginning in the stock solution. According to the invention, there are employed advantageously for every 100 parts by weight of component (H), in particular for every 100 parts by weight of $H_2O_2$, 1 to 100, preferably 2 to 90, in particular 2 to 60 parts by weight of component (P) (calculated as sodium salt).

The process of the invention and the aqueous solutions of the invention are suitable for any conventional bleaching process from aqueous medium, in which cellulosic fibrous materials are bleached with peroxy compounds, in particular with hydrogen peroxide, in the presence of alkali, especially for the bleaching of textile material, mainly after desizing and before dyeing or finishing, preferably in the textile pretreatment. The process of the invention is of particular interest for the semi-continuous and continuous bleaching of textile material widths or textile yarns, in which the bleaching liquor is adjusted during the bleaching procedure to a constant composition by further feeding-in of the stock solution or optionally with reinforcing liquors and (with water) to a constant level, e.g. according to hot bleaching, immersion bleaching or impregnation bleaching procedures. The process of the invention and the stock solutions of the invention are particularly suited for the last mentioned procedure.

For the production of the bleaching liquor and/or of the stock solutions or reinforcing liquors, there are employed with particular advantage the above concentrated compositons.

The bleaching conditions correspond in general to conventional bleaching procedures, thus, e.g. the temperatures may range in the scope of 15 to 180° C., preferably in the scope of from 40 to 120° C., the alkalinity corresponds advantageously to a NaOH-concentration of 0.2 to 8%, preferably 0.3 to 5%, in particular 0.4 to 5%; the concentration of peroxy compounds may vary broadly, depending on the kind of substrate and of the employed bleaching procedure, e.g. in the range of 0.1 to 20% by weight peroxy compound (preferably hydrogen peroxide) referred to dry substrate, in particular 0.2 to 10%, preferably 0.5 to 5% hydrogen peroxide, referred to dry substrate. For the bleaching of textile material according to impregnation methods, the textile material is advantageously impregnated with the bleaching liquor (e.g. at 15 to 40° C.) and the impregnated goods may then be stacked or rolled up and allowed to dwell in the cold (e.g. at 15 to 40° C.) or be subjected to a heat-treatment (e.g. at 80–120° C., preferably 90–105° C.), e.g. according to the hot dwell (pad-roll) process (e.g. at 80–100, preferably 90–100° C.) or according to the pad-steam process (e.g. at 95–105° C., preferably 96–103° C.), and may then be rinsed and dried. Hot bleaching takes place advantageously at 80–98° C. and immersion bleaching advantageously at 50–90° C., preferably 70–80° C. At a liquor-to-goods ratio of advantageously 5:1 to 2:1, the pH-value of the bleaching bath is advantageously in the range of 8–14, preferably 9–12.

With the polymers (P) to be employed according to the invention, there may be produced very concentrated and stable alkaline stock solutions and in the peroxide bleaching of cellulose-containing fibrous material there may be achieved optimum whiteness values, without it being necessary to employ other sequestering agents, which, however, does not exclude that other sequestering agents may additionally be employed in the case that this should be desired for a certain process or substrate. The polymers (P) to be employed according to the invention are well compatible with other sequestrants and may be combined with inorganic sequestrants, e.g. borates or silicates, as well as with organic sequestrants, e.g. acid-modified mono- or polyamines, as mentioned above under (G), or with oxyacid salts, such as hydroxyalkylidene-polyphosphonic acid derivatives, sodium gluconate, tartrate, citrate or -heptonate etc. After completion of the bleaching the polymers (P2) or (P3) may be rinsed out or washed out, particularly also from the bleached. substrate. The polymers (P) are also readily biologically degradable, so that they may be degraded in the enzymatic phase of the back-water depuration.

In the following Examples parts signify parts by weight and percentages signify percentages by weight; the temperatures are indicated in degrees Celsius. The α-amylase employed in the following Examples is a commercially available α-amylase with an activity of 120 U/g [1 U is the quantitiy of enzyme which at 37° C., pH 5.6 and a calcium content of 0.0043 M in the liquor, degrades to dextrine 5.26 g of soluble starch (Merck, Amylum Solubile Erg.B. 6, charge 9947275) per hour, determined on a solution of 6.95 g of dry starch/liter]. There are employed the following aqueous solutions:

solution (m)=35% hydrogen peroxide solution
solution (n)=19.5% solution of 2-chloroacrylic acid sodium salt
solution (p)=30% sodium hydroxide solution
solution (q)=solution of 18.45 parts of $MgCl_2.6H_2O$ in 1000 parts of water.

EXAMPLE 1

100.0 parts of native potato starch, dispersed in 100.0 parts of water, are treated during 60 minutes at pH 6.8 and at 90° C. with 17.5 parts of an aqueous 5% solution of an α-amylase with an activity of 120 U/g. Then at 75° C. 23.2 parts of sulphuric acid and 9.7 parts of solution (m) are added and subsequently 112.3 parts of solution (n) are fed-in during 50 minutes. At 75–80° C. there are now further simultaneously added during 100 minutes 453.3 parts of solution (n) and 38.9 parts of solution (m) and stirring is continued for 4 hours at 75–80° C. After this 166.0 parts of water (with traces of monomer) are distilled off under vacuum, then the pH-value is adjusted to 7.0 with solution (p), the mixture is cooled to room temperature, the total weight is adjusted with water to 900.0 parts of final product and the final product is discharged.

EXAMPLE 2

The procedure is carried out as described in Example 1, with the difference that there is carried out no enzymatic

EXAMPLE 3

The procedure is carried out as described in Example 2, with the difference that instead of 100.0 parts of native potato starch, dispersed in 100 parts of water, there are employed 50.0 parts of amylopectine from corn, dispersed in 50 parts of water.

EXAMPLE 4

The procedure is carried out as described in Example 3, with the difference that instead of amylopectine from corn there is employed amylose from potato starch.

EXAMPLE 5

100.0 parts of native potato starch, dispersed in 100.0 parts of water, are treated with 21.9 parts of sulphuric acid and 3.3 parts of solution (m) and heated to 75° C. Then 67.7 parts of solution (n) are added within 45 minutes, the temperature being kept between 75 and 77° C. Subsequently 365.7 parts of solution (n) and 6.6 parts of solution (m) are added simultaneously at the same temperature (75–77° C.) within 90 minutes. After 4 hours of further stirring 166.0 parts of water (with traces of monomer) are distilled off under vacuum, then 144.3 parts of solution (p) are regularly added dropwise within 2 hours, the pH being about 9 to 11. Stirring is now continued during 12 hours at 95° C. and then there is cooled to 40° C. The pH-value is then about 6.5±0.5. Now 26.9 parts of phthalic acid anhydride and then 53.5 parts of solution (p) are furter added and further, as soon as the anhydride has dissolved, 73.2 parts of water. Subsequently the product is discharged over a Meraklon-cloth-filter with the aid of filtering earth. There is obtained a clear, transparent, dark-brown polymer solution.

EXAMPLE 6

The procedure is carried out as described in Example 1 with the difference that instead of 100.0 parts of native potato starch dispersed in 100.0 parts of water, there are employed 50.0 parts of corn starch suspended in 50.0 parts of water, and instead of 17.5 parts of the aqueous 5% α-amylase-solution there are employed 17.5 parts of an aqueous 1% solution of the same α-amylase and the enzymatic treatment is stopped after 30 minutes by addition of sulphuric acid and there is employed only half of the respective amounts of solution (m).

EXAMPLE 7

The procedure is carried out as described in Example 5 up to the distilling-off of water (with traces of monomer), but after the 4 hours of further stirring there is cooled from 75–77° C. to 40° C and between 40 and 50° C. there are added dropwise within 2 hours 121.11 parts of an aqueous 50% potassium hydroxide solution. Now there is heated to 100° C. and without vacuum 114.50 parts of water are distilled off within 15 hours. Now there is cooled to 60–65° C. and, in order to improve the own colour, 18.61 parts of solution (m) are added and after further stirring for 2 hours at 60–65° C., there is cooled to room temperature and subsequently the pH-value is adjusted to 7.0 with a minimal quantity of potassium hydroxide solution. Now 70 parts of an aqueous 40% solution of nitrilotriacetic acid trisodium salt are further added and the product is discharges over a Meraklon-cloth-filter with the aid of filtering earth.

EXAMPLE 8

The procedure is carried out as described in Example 7, but instead of 114.50 parts of water there are now distilled off 57.0 parts of water within 7 hours. After the distilling-off of the water there is cooled to room temperature and the pH is adjusted to 7.0. Now 15 parts of magnesium chloride hexahydrate are further added thereto and subsequently the product is discharged over a Meraklon-cloth-filter with the aid of filtering earth.

EXAMPLE 9

The procedure is carried out as described in Example 7, but instead of 70 parts of an aqueous 40% solution of nitrilotriacetic acid trisodium salt, 35 parts of triethanolamine are added dropwise.

EXAMPLE 10

The procedure is carried out as described in Example 8, but in addition to the 15 parts of magnesium chloride hexahydrate 35 parts of an aqueous 40% solution of nitrilotriacetic acid trisodium salt are further added dropwise thereto.

EXAMPLE 11

100.0 parts of native potato starch, dispersed in 70.0 parts of water are treated with 44.3 parts of citric acid monohydrate and heated to 95° C. After three hours at this temperature the mixture is cooled to 75° C. and then 528.8 parts of solution (n) and 22.7 parts of solution (m) are simultaneously added during 150 minutes. After 4 hours of further stirring at 75–80° C. 55.5 parts of water are distilled off under vacuum. Then the pH is set to 7.0 with the aid of about 141.8 parts of solution (p) at about 50–60° C., then about 2.4 parts of solution (m) are further added, the mixture is cooled to room temperature and the total weight is set with water to 868.0 parts of final product.

EXAMPLE 12

The procedure is carried out as described in Example 11, but there are employed 22.6 parts of sulphuric acid instead of 44.3 parts of citric acid monohydrate. By this there are afforded about 123.1 parts of solution (p) in order to set the pH-value to 7.0. The total weight of the final product is also set to 868.0 parts.

Application Example A

100% cotton, desized and boiled-off, is padded to a pick-up of 100% with the following bleaching liquors:

- 10 ml/l of solution (q) (corresponding to a bleaching liquor of 5° dH)
- 4 ml/l of wetting agent (concentrated solution of phosphoric acid partial esters of partially di-oxyethylated $C_{8-11}$-alcohols, sodium salt)
- x ml/l of product according to Example 1
- 15 ml/l of solution (p)
- 30 ml/l of solution (m).

Then the padded fabric is allowed to dwell according to the pad-roll procedure during 90 minutes at 95° C. Subsequently it is rinsed warm and cold, up to a neutral pH.

x=5, 10 or 15.

There are obtained high effects of degree of whiteness, which are fairly delimited, depending on the product quantity.

Application Example B

The procedure is carried out as described in Application Example A, but in the bleaching liquor there are employed 20 ml/l of solution (p) (instead of 15) and 40 ml/l of solution (m) (instead of 30)

and instead of the pad-roll there is used the pad-steam procedure (treatment at 103° C. during 20 minutes). There are also obtained high bleaching effects.

Application Example C

The procedure is carried out as described in Application Example B but the bleaching liquor is produced from a five-fold reinforcing liquor:

First there is produced a reinforcing liquor of 10 ml/l of solution (q)

20 ml/l of wetting agent 100 ml/l of solution (p)

200 ml/l of solution (m)

5·x ml/l of the product according to Example 1 of which one fifth (200 ml) is diluted with 800 ml of a solution of 10 ml/liter of solution (q). The diluted bleaching liquor is then employed as in Application Example B. There are obtained similarly good white effects.

Analogously as the product according to Example 1 there are employed in each of Application Examples A, B and C the products of Examples 2 to 12.

What is claimed is:

1. A water soluble alkali metal salt of (co)poly-α-hydroxyacrylic acid based polymer made by free radical polymerization in acidic medium followed by reaction with a base and comprising;

(s) at least one carbohydrate unit; and, (a) at least one unit which is an alkali metal salt of 2-hydroxy-2-carboxylic acid ethylene-1,2-unit; and optionally (b) a unit (b), which is a unit derived from polymerization of an α,β-ethylenically unsaturated aliphatic carboxylic acid monomer having 3 to 6 carbon atoms, and further where unit denoted as (s) in the polymer ranges from 16 mole % to 67 mole %.

2. The polymer according to claim 1, where the polymer further comprises a unit (b).

3. The polymer according to claim 2, where the concentration of unit (b) is up to 50 mole percent of the total molar concentration of (a)+(b) in the polymer.

4. The polymer according to claim 1, where the unit (a) is at least 50 mole percent to 100 mole percent of the polymer of the total molar concentration of units (a)+(b).

5. The polymer according to claim 1, where the carbohydrate unit denoted as (s) is selected from a group consisting of monosaccharides, oligosaccharides, polysaccharides, modified saccharides, starches and mixtures thereof.

6. A polymer according to claim 1, in which the α-hydroxyacrylic acid units are in part lactonized.

7. A magnesium complex of the polymer of claim 6.

8. A magnesium complex of the polymer according to claim 1.

9. Aqueous dilution of a polymer comprising the polymer of claim 6 and water.

10. Concentrated aqueous composition comprising a complex according to claim 8 and water.

11. Concentrated aqueous, alkaline, stabilizer-containing solutions comprising:

a complex according to claim 8;

alkali metal hydroxide; and water.

12. Concentrated aqueous, alkaline, stabilizer-containing solutions which are alkaline stock solutions or reinforcing liquors for the peroxide bleach, comprising a complex according to claim 8 with an alkalinity of 0.2N to 8N NAOH.

13. Alkaline peroxide bleaching liquors comprising a complex according to claim 8, an alkali and a peroxide-based bleaching agent with an alkali content of 0.4% to 5% of NaOH.

14. An aqueous solution composition comprising an alkali metal salt of water-soluble (co)poly-α-hydroxyacrylic acid based polymer of claim 1, an alkali metal hydroxide and water.

15. The composition according to claim 14, further containing at least one of the following components;

(E) at least one water-soluble magnesium salt, and, (F) at least one surfactant.

16. The composition according to claim 14, where the polymer is a sodium or potassium salt.

17. The composition according to claim 14, where the polymer is a magnesium complex salt or a mixture of sodium salt and magnesium complex salt.

18. The composition according to claim 14, where the alkali metal hydroxide is sodium hydroxide or potassium hydroxide.

19. The composition according to claim 14, where the carbohydrate unit denoted as (s) is selected from a group consisting of monosaccharides, oligosaccharides, polysaccharides, modified saccharides and starches and mixtures thereof.

20. A process for the alkaline bleaching of cellulosic textile material in textile pretreatment or of paper comprising adding the composition from claim 14.

21. The composition according to claim 14, further comprising a peroxide-based bleaching agent.

22. The composition according to claim 21, with an alkalinity of 0.2N to 8N NaOH.

23. The composition according to claim 21, with an alkali content of 0.4% to 5% of NaOH.

24. The composition according to claim 21, further comprising a water soluble magnesium salt.

25. A process for alkaline bleaching of cellulosic textile material in textile pretreatment or paper comprising adding the composition from claim 24.

26. A process for alkaline bleaching of cellulosic textile material in textile pretreatment or paper, comprising adding the composition from claim 21.

27. A process according to claim 26 for the alkaline bleaching of textile material or paper by impregation methods.

* * * * *